(12) United States Patent
Adams et al.

(10) Patent No.: US 8,424,760 B2
(45) Date of Patent: *Apr. 23, 2013

(54) ALERTING A SMART CARD READER OF PROBABLE WIRELESS COMMUNICATION

(75) Inventors: Neil Patrick Adams, Waterloo (CA); Herbert Anthony Little, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/453,742

(22) Filed: Apr. 23, 2012

(65) Prior Publication Data

US 2012/0208469 A1 Aug. 16, 2012
US 2013/0045691 A2 Feb. 21, 2013

Related U.S. Application Data

(60) Continuation of application No. 12/972,444, filed on Dec. 18, 2010, now Pat. No. 8,162,211, which is a division of application No. 11/220,592, filed on Sep. 8, 2005, now Pat. No. 7,878,395.

(51) Int. Cl.
*G06F 7/04* (2006.01)

(52) U.S. Cl.
USPC .......................................................... 235/382

(58) Field of Classification Search .................. 235/382, 235/441, 472.01, 486, 492
See application file for complete search history.

(56) References Cited

U.S. PATENT DOCUMENTS

| | | |
|---|---|---|
| 5,015,830 A | 5/1991 | Masuzawa et al. |
| 5,640,307 A | 6/1997 | Bleier et al. |
| D396,452 S | 7/1998 | Naruki |
| 5,796,085 A | 8/1998 | Bleier |
| D405,070 S | 2/1999 | Kitagawa et al. |
| D423,470 S | 4/2000 | Neifer et al. |
| D426,237 S | 6/2000 | Wranne |

(Continued)

FOREIGN PATENT DOCUMENTS

| | | |
|---|---|---|
| EP | 0703676 | 3/1996 |
| EP | 1253559 | 10/2002 |

(Continued)

OTHER PUBLICATIONS

Bluetooth Special Interest Group: "SIM access profile, interoperability specification", Bluetooth Specification, Jun. 6, 2002, pp. 1-50, XP002314566.

(Continued)

*Primary Examiner* — Seung Lee
(74) *Attorney, Agent, or Firm* — Integral Intellectual Property Inc.; Miriam Paton (57) ABSTRACT

A wireless device may alert a wireless smart card reader that communication of data between the wireless device and the wireless smart card reader is probably imminent by sending an activation alert. Upon receipt of the activation alert, if the wireless smart card reader is in a low-power state, the wireless smart card reader may enter a higher-power state. If the wireless smart card reader is in the higher-power state upon receipt of the activation alert, the wireless smart card reader may remain in the higher-power state until a timeout period has expired. The wireless device may instruct the wireless smart card reader to enter the low-power state by sending a deactivation alert if the wireless device detects that communication of data between the wireless device and the wireless smart card reader is not likely to occur within a specified period of time.

15 Claims, 5 Drawing Sheets

U.S. PATENT DOCUMENTS

| | | |
|---|---|---|
| D475,708 S | 6/2003 | Bergstrom |
| D501,208 S | 1/2005 | Ozolins et al. |
| 6,867,965 B2 | 3/2005 | Khoo |
| 7,110,792 B2 | 9/2006 | Rosenberg |
| 7,134,600 B2 | 11/2006 | Tomoeda et al. |
| 7,188,777 B2 | 3/2007 | Yamagata et al. |
| 7,562,219 B2 | 7/2009 | Lazaridis et al. |
| 2001/0021980 A1 | 9/2001 | Linden et al. |
| 2002/0082042 A1 | 6/2002 | Mark et al. |
| 2003/0105954 A1 | 6/2003 | Immonen et al. |
| 2003/0183691 A1 | 10/2003 | Lahteenmaki et al. |
| 2004/0188519 A1 | 9/2004 | Cassone |
| 2004/0199474 A1 | 10/2004 | Ritter |
| 2004/0204120 A1 | 10/2004 | Jiles |
| 2004/0259542 A1 | 12/2004 | Viitamaki et al. |
| 2006/0236117 A1 | 10/2006 | Lazaridis et al. |

FOREIGN PATENT DOCUMENTS

| | | |
|---|---|---|
| EP | 1349031 | 10/2003 |
| EP | 1471453 | 10/2004 |
| WO | 02/01520 | 1/2002 |
| WO | 02/21867 | 3/2002 |

OTHER PUBLICATIONS

Beasley, Jim et al., "Virtual Bluetooth™ Devices as a Means of Extending Pairing and Bonding in a Bluetooth Network", ICC 2002, IEEE International Conference on vol. 4, pp. 2087-2089 vol. 4.
Ruschmann, F., Extended European Search Report for EP 05108270.9, Apr. 7, 2006.
Ruschmann, F., Extended European Search Report for EP 05108270.9, May 5, 2006.
Wen, Ann, First Office Action for CA 2555040, Dec. 19, 2007.

ALERTING A SMART CARD READER OF PROBABLE WIRELESS COMMUNICATION

CROSS-REFERENCE TO RELATED APPLICATIONS

This application is a continuation of U.S. patent application Ser. No. 12/972,444 filed Dec. 18, 2010, issued Apr. 24, 2012 as U.S. Pat. No. 8,162,211, which is itself a divisional of U.S. patent application Ser. No. 11/220,592 filed Sep. 8, 2005, issued Feb. 1, 2011 as U.S. Pat. No. 7,878,395, and both of which are incorporated by reference herein in their entirety.

BACKGROUND

Bluetooth® is a technology for low-power, low-bandwidth wireless connections between devices. Connected devices form a small network known as a piconet, with a master device and one or more slave devices. In Active Mode, a Bluetooth® device (BT device) participates actively on the transmission channel. The Bluetooth® core specifications v1.1, published Feb. 22, 2001 by the Bluetooth® special interest group (SIG) and the Bluetooth® core specifications v1.2, published Nov. 5, 2003, include provisions for three low-power modes to conserve battery life. These modes, in decreasing order of power requirements, are Sniff Mode, Hold Mode, and Park Mode.

While in the Sniff Mode, the device listens to the piconet at a reduced rate, related to three parameters: Sniff Interval, Sniff Attempt and Sniff Timeout. These parameters are programmable, providing flexibility for different applications. The Hold Mode is similar to the Park Mode, except that the device retains its Active Member Address, which distinguishes the device from other devices in the piconet. In the Park Mode, the device does not participate at all in the piconet, although the device's clock continues to run and remains synchronized to the master device.

If a user of a first device wants the first device to communicate wirelessly with a second device that is in Sniff Mode, the communications therebetween will be delayed until the second device has listened to the piconet during a Sniff Interval and has transitioned from Sniff Mode to Active Mode. For example, it may take the second device around 2 seconds to transition from Sniff Mode to Active Mode. In a situation where communication with the second device tends to happen in short bursts of about 2 to 5 seconds duration, the delay incurred by transitioning from Sniff Mode to Active Mode may cause the second device to appear sluggish to user-initiated activity.

Similar concerns may arise with devices compatible with other wireless communication protocols, a non-exhaustive list of examples for which includes ZigBee™, radio frequency identification (RFID), ultra wideband (UWB), IEEE 802.11 and various proprietary communication protocols.

BRIEF DESCRIPTION OF THE DRAWINGS

Embodiments are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

Figure 1:
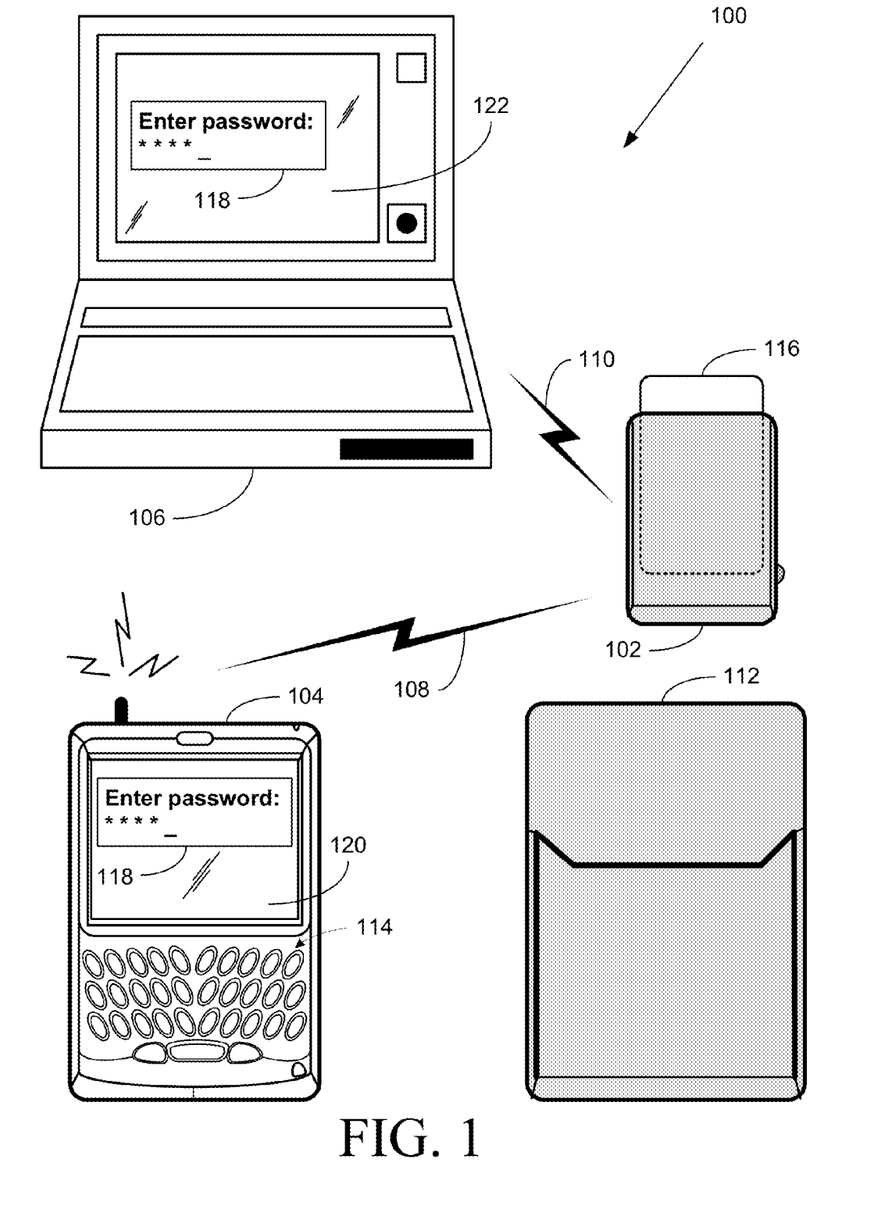
FIG. 1 is an illustration of an exemplary communications system, according to some embodiments.

FIG. 1 is a schematic diagram of an exemplary system, according to some embodiments of the invention. A system 100 includes a wireless smart card reader 102, a mobile device 104, and a wireless-enabled personal computer 106. Smart card reader 102 and mobile device 104 are able to communicate over a wireless communication link 108. Smart card reader 102 and personal computer 106 are able to communication over a wireless communication link 110.

Mobile device 104 has a carrying case 112. The mechanical features of mobile device 104 and carrying case 112, as shown in FIG. 1, are exemplary, and mobile devices and carrying cases having different mechanical features are also contemplated. For example, mobile device 104 is shown as able to be inserted into carrying case 112; however, other means for securing a mobile device and a carrying case are also contemplated. When mobile device 104 is secured to carrying case 112, a user of mobile device 104 is unable to provide input to mobile device 104 using a keyboard 114.

A smart card 116 is shown inserted into smart card reader 102. Smart cards are personalized security devices, defined by the ISO7816 standard and its derivatives, as published by the International Organization for Standardization. A smart card may have a form factor of a credit card and may include a semiconductor device. The semiconductor device may include a memory that can be programmed with security information (e.g., a private decryption key, a private signing key, biometrics, etc.) and may include a processor and/or dedicated logic, for example, dedicated decryption logic and/or dedicated signing logic. A smart card may include a connector for powering the semiconductor device and performing serial communication with an external device. Alternatively, smart card functionality may be embedded in a device having a different form factor and different communication protocol, for example a Universal Serial Bus (USB) device. The person whose security information is stored on smart card 116 may use smart card reader 102 for identification, to unlock mobile device 104 and/or personal computer 106, and to digitally sign and/or decrypt messages sent by mobile device 104 and/or personal computer 106. Smart card 116 may also include a random number generator.

For example, mobile device 104 may be able to send and receive e-mail messages via an e-mail server (not shown). If, for example, the Secure Multipurpose Internet Mail Extensions (S/MIME) protocol is used, e-mail messages received at mobile device 104 are encrypted using a symmetric algorithm with a random session key generated by the sender of the e-mail message. The e-mail message also includes the session key, encrypted using the public key of the recipient. Upon receipt of an encrypted e-mail message, mobile device 104 may extract the encrypted session key and send it to smart card reader 102 via communication link 108. Smart card reader 102 may send the encrypted session key to smart card 116, and the decryption engine of smart card 116 may decrypt the encrypted session key using the recipient's private decryption key, which is stored in smart card 116. Smart card reader 102 may retrieve the decrypted session key from smart card 116 and forward it to mobile device 104 via communication link 108 so that mobile device 104 can decrypt the received e-mail message. The smart card 116 may prevent unauthorized use of the recipient's private decryption key by requiring that a password or personal identification number (PIN) be supplied before allowing the decryption operation to proceed.

Similarly, to add a digital signature to an e-mail message being sent by mobile device 104, mobile device 104 may send a hash of the contents of the e-mail message to smart card reader 102 over communication link 108. Smart card reader 102 may pass the hash to smart card 116, which may produce a digital signature from the hash and the sender's private signing key, which is stored in smart card 116. Smart card 116 may then pass the digital signature to smart card reader 102, which may forward it to mobile device 104 via communication link 108 so that mobile device 104 can transmit it along with the e-mail message to the e-mail server. Again, smart card 116 may prevent unauthorized use of the recipient's private signing key by requiring that a password or PIN be supplied before allowing the signing operation to proceed.

The unencrypted message key should be sent securely over communication link 108 from smart card reader 102 to mobile device 104 to prevent a third party from retrieving the message key from communication link 108. Similarly, the hash to be signed should be sent authentically over communication link 108 from smart card reader 102 to mobile device 104 to prevent a third party from modifying the hash and thereby causing smart card 116 to produce a signature using a hash different from the hash of the intended message. Therefore communication link 108 may need to be secured using cryptographic techniques.

The person whose security information is stored on smart card 116 may wish to digitally sign outgoing e-mail sent from personal computer 106 or to decrypt incoming encrypted e-mail received at personal computer 106. This will require personal computer 106 to communicate with smart card reader 102 in much the same way as mobile device 104 communicates with smart card reader 102 as described above. For this purpose, or for other security-related measures (e.g. to permit the person to unlock and use personal computer 106), communication link 110 may need to be secured using cryptographic techniques.

To secure communication links 106 and 110, smart card reader 102 may need to generate various cryptographic keys. For example, if communication links 108 and 110 are Bluetooth® communication links, then a relatively short (up to 16-digits) key may be used for the Bluetooth® pairing procedure. An additional layer of security for communication links 108 and 110 may involve encryption with one or more additional keys. These additional keys may be generated from a shared secret between smart card reader 102 and mobile device 104, and one or more symmetric keys based on this shared secret may be generated using known Diffie-Hellman and simple password exponential key exchange (SPEKE) methods and variants thereof. Moreover, random session keys may be generated for each individual communication session over communication link 108 or 110.

When mobile device 104 is removed from carrying case 112, or when mobile device 104 has not been in use for a predefined period of time, the user may be presented with a password dialog 118 on a display 120 of mobile device 104. Upon entry of the correct password, mobile device 104 may become unlocked. Alternatively, if a two-factor authentication scheme involving smart card reader 102 is used, mobile device 104 requests two passwords from the user, one password to unlock mobile device 104, and one password to unlock smart card reader 102. These passwords may be the same. Mobile device 104 may send the smart card reader password to smart card reader 102 in a login request, and smart card reader 102 may indicate to mobile device 104 whether the smart card reader password is correct. As an additional measure, mobile device 104 may check whether the correct smart card is inserted in smart card reader 102 by checking a unique identifier of smart card 116, for example, its serial number. If smart card 116 is the correct smart card and the user of mobile device 104 has provided the correct smart card reader password, then smart card reader 102 is unlocked.

Similarly, when personal computer 106 has not been in use for a predefined period of time, or when a user logs on to personal computer 106, the user may be presented with password dialog 118 on a display 122 of personal computer 106. Upon entry of the correct password, personal computer 106 may become unlocked.

Smart card reader 102 may be able to enter one or more low-power modes in order to conserve battery power. The time required for smart card reader 102 to transition from a low-power mode to a higher-power mode may increase the response time of smart card reader 102 to user-initiated activity.

For example, if smart card reader 102 is a BT device, the low-power mode may be Sniff Mode and the higher-power mode may be Active Mode. If smart card reader 102 is a master in the piconet, then the transition from Sniff Mode to Active Mode may include a transition from Sniff Mode to Sniff Transition Mode and a transition from Sniff Transition Mode to Active Mode.

Figure 2:
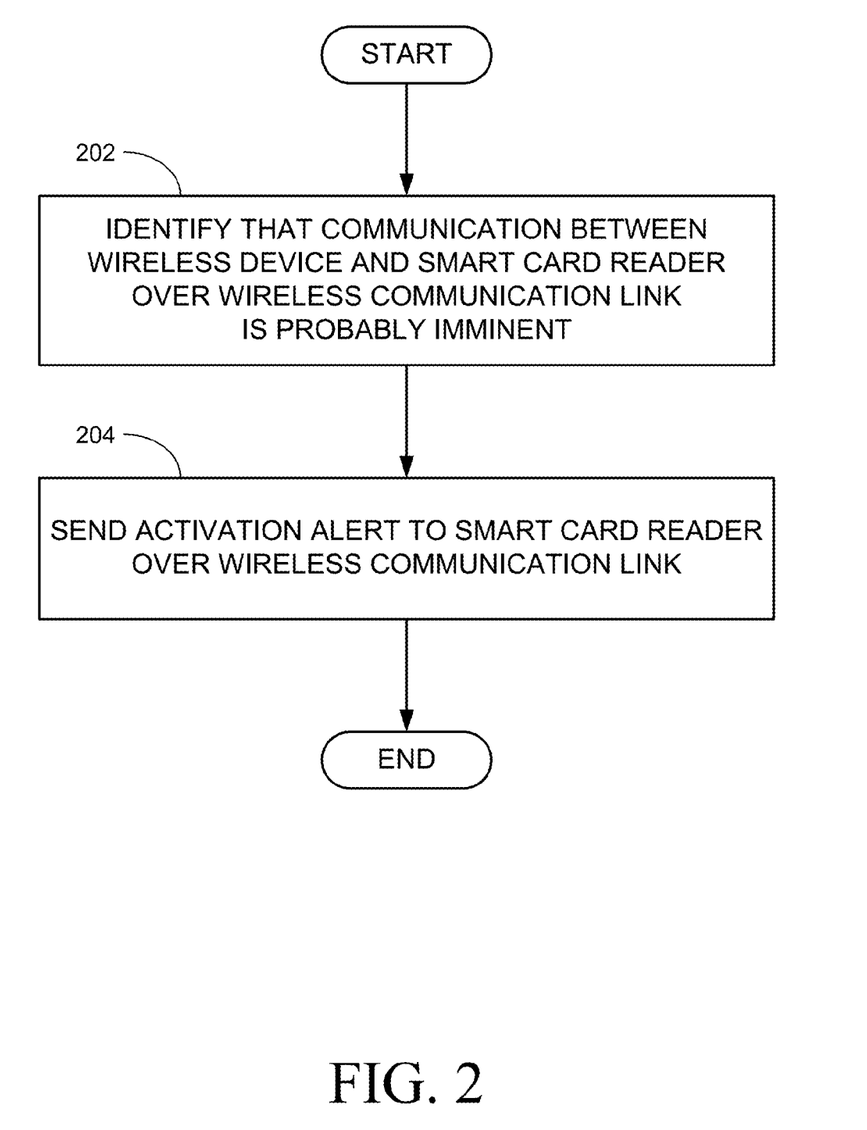
FIG. 2 is a flowchart of an exemplary method to be implemented in a wireless device, according to some embodiments.

FIG. 2 is a flowchart of an exemplary method to be implemented by a wireless device that is able to communicate with smart card reader 102, according to some embodiments. For example, this wireless device may be mobile device 104 and/or personal computer 106. At 202, the device may identify that communication of data between the device and smart card reader 102 is probably imminent. At 204, the device may therefore send an activation alert to smart card reader 102.

If smart card reader 102 is in a low-power mode yet periodically awakens in order to listen to the transmission channel, smart card reader 102 will receive the activation alert. Upon receipt of the activation alert, smart card reader 102 may transition into a higher-power mode in order to be prepared to receive subsequent communications from the device. This is described in further detail below with respect to FIG. 4.

The device, for example, mobile device 104 or personal computer 106, may send the alert in the background while the user is doing some other operation. Therefore, from the user's perspective, smart card reader 102 may appear to be available for communication of data as soon as needed by the user.

A non-exhaustive list of conditions that may trigger the device to send the activation alert includes:

(1) The device is unlocked. When the user unlocks the device, the probability that the user is going to access smart card reader 102 increases greatly. Upon being unlocked, the device may begin to receive encrypted messages that require communication with smart card reader 102 for the purpose of decryption. Similarly, upon being unlocked, the device may begin to send encrypted messages that require communication with smart card reader 102 for the purpose of adding a digital signature.

(2) Mobile device 104 is removed from carrying case 112. If smart card reader 102 is used for two-factor authentication, then mobile device 104 must communicate with smart card reader 102 in order for the user to unlock mobile device 104. Having mobile device 104 send the activation alert to smart card reader 102 upon being removed from carrying case 112 increases the likelihood that smart card reader 102 will be active in time to respond to communication from mobile device 104 for the unlocking of mobile device 104.

(3) User starts to compose an e-mail message. Once the user has finished composing the e-mail message, adding a digital signature to the e-mail message will require communication with smart card reader 102. Having the device send the activation alert to smart card reader 102 when the user starts to compose the e-mail message increases the likelihood that smart card reader 102 will be active by the time the user sends the e-mail message.

(4) Password dialog is displayed on device to user. If a two-factor authentication scheme involving smart card reader 102 is used to unlock the device, then once the user types the password in the password dialog and presses enter (or any other equivalent user input), the device will initiate communication with smart card reader 102 for the additional factor of the authentication scheme. Having the device send the activation alert to smart card reader 102 when the password dialog is displayed on the device to the user increases the likelihood that smart card reader 102 will be active by the time the user finishes typing the password and pressing enter.

(5) User begins typing password. If a two-factor authentication scheme involving smart card reader 102 is used to unlock the device, then once the user types the password in the password dialog and presses enter (or any other equivalent user input), the device will initiate communication with smart card reader 102 for the additional factor of the authentication scheme. However, there may be a delay from the time the password dialog is displayed until the user actually types in the password and presses enter. Having the device send the activation alert to smart card reader 102 when the user begins typing the password enables smart card reader 102 to remain in a low-power state for a longer period of time, while still increasing the likelihood that smart card reader 102 will be active by the time the user finishes typing the password and pressing enter.

Figure 3:
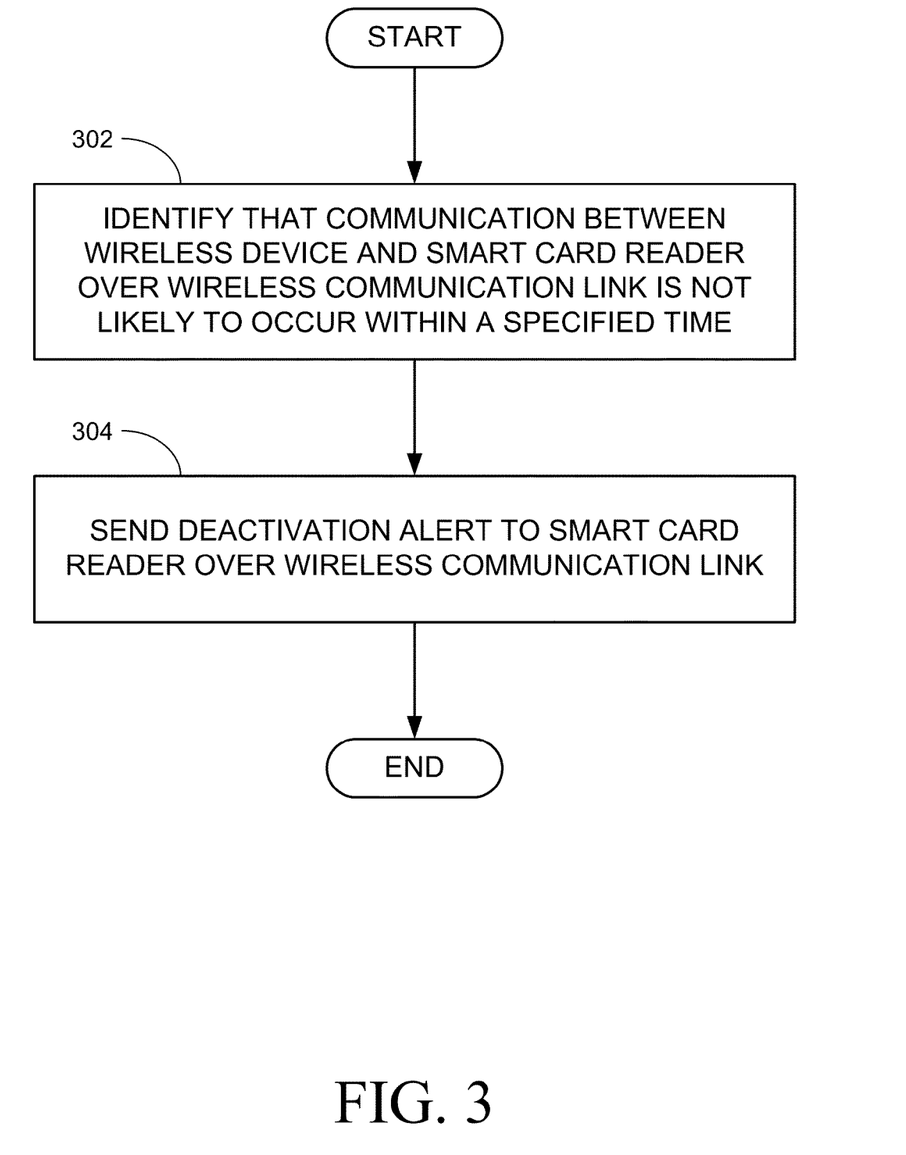
FIG. 3 is a flowchart of another exemplary method to be implemented in a wireless device, according to some embodiments.

FIG. 3 is a flowchart of another exemplary method to be implemented by a wireless device that is able to communicate with smart card reader 102, according to some embodiments. For example, this wireless device may be mobile device 104 and/or personal computer 106. At 302, the device may identify that communication of data between the device and smart card reader 102 is not likely to occur within a specified period of time. The specified period of time may be a configurable parameter. The specified period of time may be configurable, for example, through an information technology (IT) policy. At 304, the device may therefore send a deactivation alert to smart card reader 102.

Upon receipt of the deactivation alert, smart card reader 102 may transition into a low-power mode in order to conserve battery power. This is described in further detail below with respect to FIG. 4.

A non-exhaustive list of conditions that may trigger the device to send the deactivation alert includes:

(1) The device is locked. When the device is locked, the likelihood that the user is going to access smart card reader 102 decreases greatly. Having the device send a deactivation alert to smart card reader 102 upon being locked (or just prior to being locked) may enable smart card reader 102 to transition into a low-power mode and conserve battery power.

(2) Mobile device 104 is placed inside carrying case 112. As explained above, when mobile device 104 is inside carrying case 112, a user of mobile device 104 is unable to provide input to mobile device 104 using a keyboard 114. Therefore, when mobile device 104 is inside carrying case 112, the likelihood that the user is going to access smart card reader 102 decreases greatly. Having mobile device 104 send the deactivation alert to smart card reader 102 upon being placed inside carrying case 112 may enable smart card reader 102 to transition into a low-power mode and conserve battery power.

Figure 4:
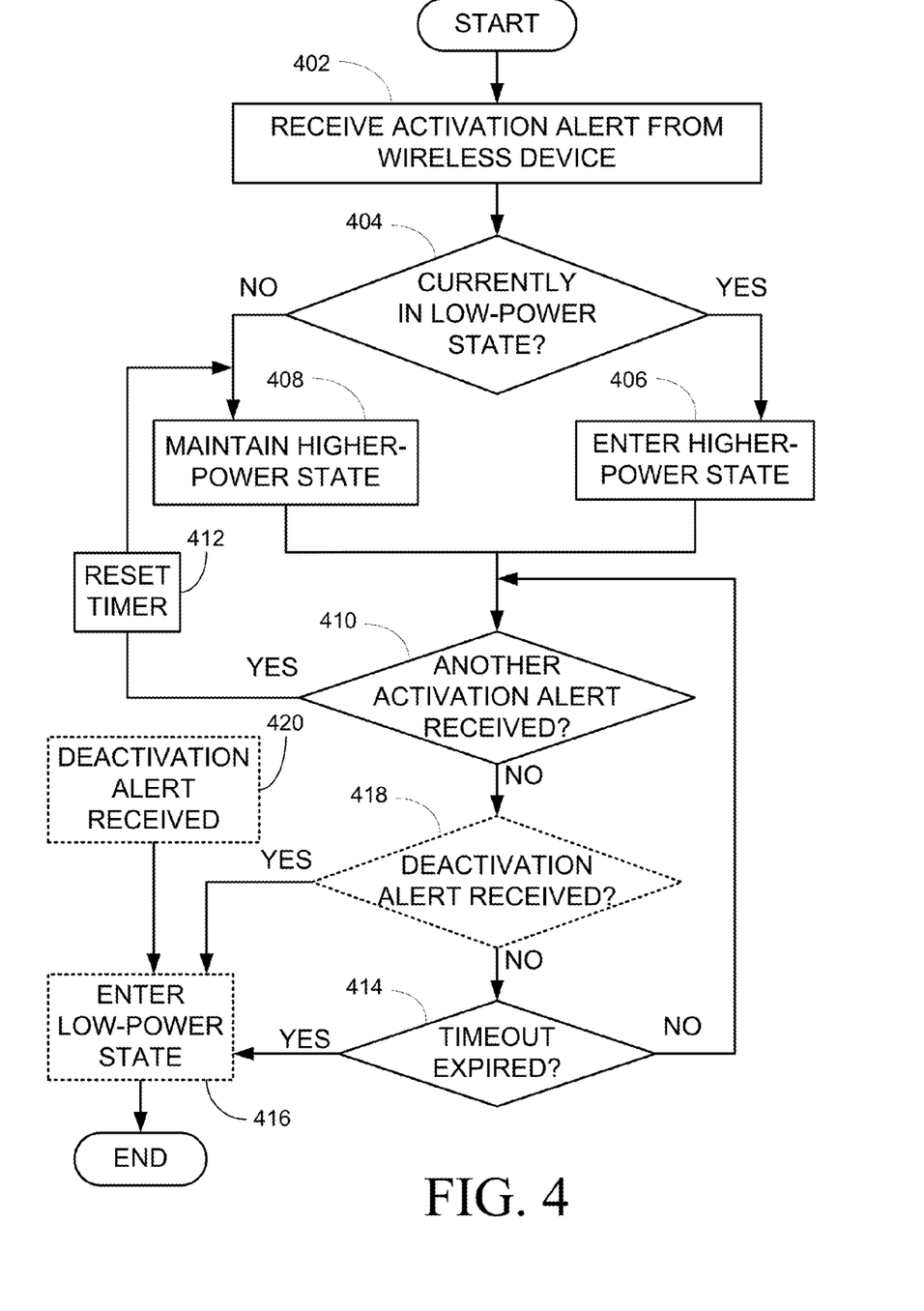
FIG. 4 is a flowchart of an exemplary effect of an activation alert on a smart card reader, according to some embodiments.

The effect of the activation and deactivation alerts on smart card reader 102, according to some embodiments, is illustrated in FIG. 4.

At 402, smart card reader 102 receives the activation alert from the device, for example, from mobile device 104 or from personal computer 106.

If smart card reader 102 is currently in a low-power state (checked at 404), then smart card reader 102 enters a higher-power state at 406, and otherwise, smart card reader 102 maintains the higher-power state at 408. For example, if smart card reader 102 is a BT device, smart card reader 102 may be in Sniff Mode when in the low-power state, and in Active Mode when in the higher-power state.

For the duration of a timeout period, smart card reader 102 checks at 410 whether it has received another activation alert (from any device). If so, smart card reader 102 resets the timer for the timeout period at 412, and the method continues from 408. Otherwise, once the timeout period has expired, which is checked at 414, smart card reader 102 may enter the low-power state at 416.

At any time, smart card reader 102 may receive a deactivation alert. If the deactivation alert is received within the timeout period following receipt of an activation alert, as at 418, then smart card reader 102 may enter the low-power state at 416 without waiting for the timeout period to expire. If the deactivation alert is received independently of an activation alert, as at 420, then smart card reader 102 may enter the low-power state at 416.

Figure 5:
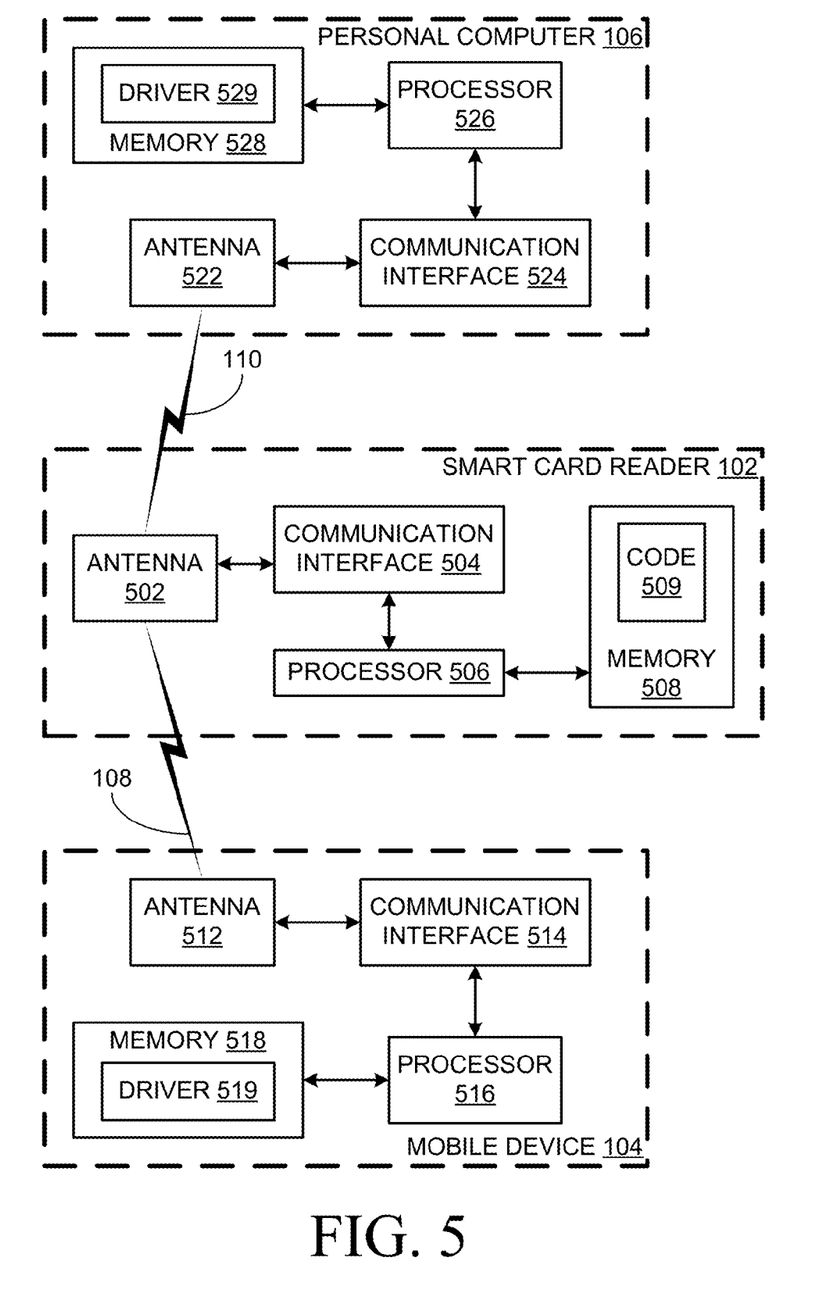
FIG. 5 is a block diagram of the exemplary communications system of FIG. 1, according to some embodiments of the invention.

FIG. 5 is a block diagram of system 100, according to some embodiments of the invention. For clarity, some components of smart card reader 102, mobile device 104, and personal computer 106 are not shown in FIG. 5 and are not described explicitly below.

Smart card reader 102, mobile device 104 and personal computer 106 include antennae 502, 512, and 522, respectively. A non-exhaustive list of examples for antennae 502, 512 and 522 includes dipole antennae, monopole antennae, multilayer ceramic antennae, planar inverted-F antennae, loop antennae, shot antennae, dual antennae, omnidirectional antennae and any other suitable antennae.

Smart card reader 102, mobile device 104 and personal computer 106 include communication interfaces 504, 514, and 524, respectively, which are coupled to antennae 502, 512, and 522, respectively. A non-exhaustive list of examples of communication procotols with which communication interfaces 504, 514 and 524 may be compatible includes Bluetooth®, ZigBee™, radio frequency identification (RFID), ultra wideband (UWB), IEEE 802.11 and various proprietary communication protocols.

Smart card reader 102 also includes a processor 506 coupled to communication interface 504, and a memory 508 coupled to processor 506. Memory 508 may be fixed in or removable from smart card reader 102. Memory 508 may be embedded or partially embedded in processor 506. Processor 506 and memory 508 may be part of the same integrated circuit or in separate integrated circuits. Communication interface 504 and processor 506 may be part of the same integrated circuit or in separate integrated circuits.

Mobile device 104 also includes a processor 516 coupled to communication interface 514, and a memory 518 coupled to processor 516. Memory 518 may be fixed in or removable from mobile device 104. Memory 518 may be embedded or partially embedded in processor 516. Processor 516 and memory 518 may be part of the same integrated circuit or in separate integrated circuits. Communication interface 514 and processor 516 may be part of the same integrated circuit or in separate integrated circuits.

Personal computer 106 also includes a processor 526 coupled to communication interface 524, and a memory 528 coupled to processor 526. Memory 528 may be fixed in or removable from personal computer 106. Memory 528 may be embedded or partially embedded in processor 526. Processor 526 and memory 528 may be part of the same integrated circuit or in separate integrated circuits. Communication interface 524 and processor 526 may be part of the same integrated circuit or in separate integrated circuits.

A non-exhaustive list of examples for processors 506, 516 and 526 includes a central processing unit (CPU), a digital signal processor (DSP), a reduced instruction set computer (RISC), a complex instruction set computer (CISC) and the like. Furthermore, processors 506, 516 and 526 may each be part of an application specific integrated circuit (ASIC) or may each be part of an application specific standard product (ASSP).

A non-exhaustive list of examples for memories 506, 516 and 526 includes any combination of the following:

a) semiconductor devices such as registers, latches, read only memory (ROM), mask ROM, electrically erasable programmable read only memory devices (EEPROM), flash memory devices, non-volatile random access memory devices (NVRAM), synchronous dynamic random access memory (SDRAM) devices, RAMBUS dynamic random access memory (RDRAM) devices, double data rate (DDR) memory devices, static random access memory (SRAM), universal serial bus (USB) removable memory, and the like;

b) optical devices, such as compact disk read only memory (CD ROM), and the like; and c) magnetic devices, such as a hard disk, a floppy disk, a magnetic tape, and the like.

Memories 518 and 528 may store respective drivers 519 and 529 for smart card reader 102. Drivers 519 and 529 may implement portions of the methods described above.

Memory 508 may store executable code 509 which, when executed by processor 506, may cause smart card reader 102 to implement portions of the methods described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   detecting at a first wireless device one or more conditions that increase a likelihood that communication of data between said first wireless device and a second wireless device over a wireless communication link will begin imminently; and
   responsive to detecting said one or more conditions, having said first wireless device send an activation alert over said wireless communication link to said second wireless device, said activation alert to prompt said second wireless device, when in a low-power state, to transition from said low-power state to a higher-power state.

2. The method as recited in claim 1, wherein detecting said one or more conditions comprises:
   detecting that said first wireless device has been unlocked.

3. The method as recited in claim 1, wherein detecting said one or more conditions comprises:
   detecting that said first wireless device has been removed from a carrying case for said first wireless device.

4. The method as recited in claim 1, wherein detecting said one or more conditions comprises:
   detecting that composition of an electronic mail message on said first wireless device has started.

5. The method as recited in claim 1, wherein detecting said one or more conditions comprises:
   detecting that a password dialog has been presented on a display screen of said first wireless device.

6. The method as recited in claim 1, wherein detecting said one or more conditions comprises:
   detecting that entry of a password in a password dialog presented on a display screen of said first wireless device has started.

7. The method as recited in claim 1, wherein said first wireless device and said second wireless device are compatible with a wireless personal area network communication protocol.

8. The method as recited in claim 1, wherein said one or more conditions involve only said first wireless device and are independent of said second wireless device.

9. The method as recited in claim 1, wherein said second wireless device comprises smart card reader functionality.

10. A first wireless device comprising:
    a wireless communication interface;
    a processor coupled to said wireless communication interface; and
    a memory coupled to said processor, said memory to store code which, when executed by said processor, detects at said first wireless device one or more conditions that indicate that communication of data between said first wireless device and a second wireless smart device over a wireless communication link will occur within a specified period of time, and in response to detecting said one or more conditions sends an activation alert to said second wireless device over said wireless communication link via said wireless communication interface, said activation alert to prompt said second wireless device, when in a low-power state, to transition from said low-power state to a higher-power state.

11. The first wireless device as recited in claim 10, wherein said one or more conditions comprise that said first wireless device has been unlocked.

12. The first wireless device as recited in claim 10, wherein said one or more conditions comprise that said first wireless device has been removed from a carrying case.

13. The first wireless device as recited in claim 10, wherein said one or more conditions comprise that composition of an electronic mail message on said first wireless device has started.

14. The first wireless device as recited in claim 10, further comprising a display screen coupled to said processor, wherein said one or more conditions comprise that a password dialog has been presented on said display screen.

15. The first wireless device as recited in claim 10, further comprising a display screen coupled to said processor, wherein said one or more conditions comprise that entry of a password in a password dialog presented on said display screen has started.

* * * * *